(12) United States Patent
Chen et al.

(10) Patent No.: US 10,937,084 B2
(45) Date of Patent: *Mar. 2, 2021

(54) TRACKING BUSINESS PERFORMANCE IMPACT OF OPTIMIZED SOURCING ALGORITHMS

(71) Applicant: International Business Machines Corporation, Armonk, NY (US)

(72) Inventors: Shyh-Kwei Chen, Chappaqua, NY (US); Ajay A. Deshpande, White Plains, NY (US); Saurabh Gupta, Irving, TX (US); Arun Hampapur, Norwalk, CT (US); Ali Koc, White Plains, NY (US); Yingjie Li, Chappaqua, NY (US); Dingding Lin, Beijing (CN); Xuan Liu, Yorktown Heights, NY (US); Christopher S. Milite, Oxford, CT (US); Brian L. Quanz, Yorktown Heights, NY (US); Chek Keong Tan, Danbury, CT (US); Dahai Xing, White Plains, NY (US); Xiaobo Zheng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/827,458

(22) Filed: Nov. 30, 2017

(65) Prior Publication Data

US 2018/0082355 A1    Mar. 22, 2018

Related U.S. Application Data

(63) Continuation of application No. 15/406,323, filed on Jan. 13, 2017, now Pat. No. 10,650,438.

(Continued)

(51) Int. Cl.
  *G06Q 30/06* (2012.01)
  *G06Q 10/06* (2012.01)

(52) U.S. Cl.
  CPC ... *G06Q 30/0635* (2013.01); *G06Q 10/06393* (2013.01)

(58) Field of Classification Search
  CPC ................... G06Q 10/06393; G06Q 30/0635
  See application file for complete search history.

(56) References Cited

U.S. PATENT DOCUMENTS 8,005,709 B2   8/2011   King et al.
8,966,498 B2   2/2015   Maes
(Continued)

FOREIGN PATENT DOCUMENTS

WO   2011139630 A1   11/2011
WO   2013019245 A2   2/2013

OTHER PUBLICATIONS

Finnie et al., "Real-time business intelligence in multi-agent adaptive supply networks", Smart Enterprises Res. & Innovation Centre, Bond Univ., Gold Coast, Australia; IEEE Xplore Abstract, The 2005 IEEE International Conference on e-Technology, e-Commerce and e-Service, 2005, EEE'05 Proceedings; Mar. 29-Apr. 1, 2005, pp. 218-221.

(Continued)

*Primary Examiner* — Andre D Boyce
(74) *Attorney, Agent, or Firm* — Scully, Scott, Murphy & Presser, P.C.; Joseph Petrokaitis, Esq.

(57) ABSTRACT

A method for continuously tracking business performance impact of order sourcing systems and algorithms that decide how ecommerce orders should be fulfilled by assigning the items of the order to nodes in a fulfillment network such as stores, distribution centers, and third party logistics—to provide automatic root cause analysis and solution recom- (Continued)

mendations to pre-defined business problems arising from KPI monitoring. A Business Intelligence (BI) dashboard architecture operates with: 1) a monitoring module that continuously monitors business KPIs and creates abnormality alerts; and 2) a root cause analysis module that is designed specifically for each business problem to give real time diagnosis and solution recommendation. The root cause analysis module receives the created alert, and triggers conducting a root cause analysis at an analytics engine. The BI dashboard and user interface enables visualization of the KPI performance and root cause analysis results.

7 Claims, 9 Drawing Sheets

Related U.S. Application Data

(60) Provisional application No. 62/337,089, filed on May 16, 2016.

(56) References Cited

U.S. PATENT DOCUMENTS

| | | | |
|---|---|---|---|
| 2009/0144110 A1* | 6/2009 | Fortner | G06Q 10/06 705/7.41 |
| 2009/0171879 A1* | 7/2009 | Bullen | G06N 7/005 706/47 |
| 2011/0054968 A1* | 3/2011 | Galaviz | G06Q 10/06 705/7.28 |
| 2013/0325741 A1 | 12/2013 | Smalling et al. | |
| 2014/0068348 A1 | 3/2014 | Modnal et al. | |
| 2014/0379411 A1* | 12/2014 | Earle | G06Q 10/06315 705/7.25 |
| 2015/0286684 A1 | 10/2015 | Heinz et al. | |
| 2016/0217399 A1* | 7/2016 | Roelofs | G06Q 10/0635 |
| 2016/0217406 A1* | 7/2016 | Najmi | G06Q 10/06315 |
| 2017/0126476 A1* | 5/2017 | Curtin | H04L 41/0631 |

OTHER PUBLICATIONS

Janiesch et al., "Beyond process monitoring: a proof-of-concept of event-driven business activity management", original publication http://www.emeraldinsight.com, permanent URL: http://dx.doi.org/10.1108/14637151211253765; Business Process Management Journal, vol. 18 Iss: 4, Jul. 2012; pp. 625-643.

Acimovic, "Lowering Outbound Shipping Costs in an Online Retail Environment by Making Better Fulfillment and Replenishment Decisions", Massachusetts Institute of Technology, Sep. 2012, 198 pages.

NIST, "NIST Cloud Computing Program", http://csrc.nist.gov/groups/SNS/cloud-computing/index.html, Created on Nov. 15, 2010, Last updated on Mar. 2, 2016, 2 pages.

Xu, "Order Fulfillment in Online Retailing: What Goes Where", Massachusetts Institute of Technology, Sep. 2005, 146 pages.

List of IBM Patents or Patent Applications Treated as Related.

* cited by examiner

TRACKING BUSINESS PERFORMANCE IMPACT OF OPTIMIZED SOURCING ALGORITHMS

CROSS REFERENCE TO RELATED PATENTS AND APPLICATIONS

This application claims priority from U.S. Provisional Patent Application No. 62/279,738 filed Jan. 16, 2016 and U.S. Provisional Patent Application No. 62/337,089 filed on May 16, 2016, which is incorporated by reference as if fully set forth herein in its entirety.

FIELD

The present application relates generally to computers, and computer applications, and more particularly to computer-implemented method to generate sourcing selections for continuously tracking business performance impact of optimized sourcing algorithms.

BACKGROUND

An order fulfillment and sourcing engine touches every aspect of an e-retailer's business, e.g., warehouse inventory, fulfillment center processing capacity, and outbound shipments. Business users need a BI (business intelligence) dashboard tool or like data visualization tool for displaying the current status of metrics and key performance indicators (KPIs) and monitor KPIs performance, diagnose operational disruptions and find solutions in real time.

The standard practice in the industry is to monitor business KPIs for an order fulfillment system in real time. However, such practice only tracks the outcomes of the order fulfillment optimization system, and does not provide explicit and automatic root cause analysis when a business KPI deteriorates.

Business users have to perform ad-hoc data analysis to diagnose a problem, which could take very long before finding a solution. If the order fulfillment system goes offline due to the delayed diagnosis, the retailer could lose millions of dollars in sales.

BRIEF SUMMARY

A system and method for continuously tracking business performance impact of order sourcing systems, i.e., systems that determine how to assign the items of an order to nodes, such as stores or distribution centers, in a network for fulfillment.

The system and method additionally provides for automatic root cause analysis and solution recommendations to pre-defined business problems arising from KPI monitoring. It provides better support to business users than traditional KPI monitoring systems because of its automatic root cause analysis and solution recommendation.

In one aspect, there is provided a method of tracking business performance. The method comprises: monitoring, at the processor device, data from one or more real-time data streams, computing at the processor device, based on the data from the one or more real-time data streams, a performance indicator value associated with a business operation; evaluating, at the processor device the computed performance indicator value against a predetermined value associated with that performance indicator; automatically generating, by the processor device, an alert signal responsive to a computed performance indicator evaluated as one of: not achieving the predetermined value or exceeding the predetermined value for that performance indicator; communicating the alert signal to a root cause analyzer device selected to analyze a cause for the performance indicator one of: not achieving the predetermined value or exceeding the predetermined value for that performance indicator; determining, at the selected root cause analyzer device, a root cause analysis result for the performance indicator; and providing, via a user interface device, a recommendation to improve a performance measure of the business operation based on the determined root cause analysis result.

In a further aspect, there is provided a system of tracking business performance. The system comprises one or more processor devices associated with a computer system, and a storage device associated with the computer system for storing instructions to configure the one or more processor devices to: monitor data from one or more real-time data streams, compute, based on the data from the one or more real-time data streams, a performance indicator value associated with a business operation; evaluate the computed performance indicator value against a predetermined value associated with that performance indicator; automatically generate an alert signal responsive to a computed performance indicator evaluated as one of: not achieving the predetermined value or exceeding the predetermined value for that performance indicator; communicate the alert signal to a root cause analyzer device selected to analyze a cause for the performance indicator one of: not achieving the predetermined value or exceeding the predetermined value for that performance indicator; determine, at the selected root cause analyzer device, a root cause analysis result for the performance indicator; and provide, via a user interface device, a recommendation to improve a performance measure of the business operation based on the determined root cause analysis result.

A computer program product for storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 6 depicts an example of a generated demand destination average zone map (average zone at store level) according to one embodiment;

FIG. 8 depicts an example BI dashboard display interface generated for a user to indicate a result of implementing the analytics methods of the present disclosure.

DETAILED DESCRIPTION

A computer system and computer-implemented method continuously tracks business performance impact data including KPIs, provides for automatic root cause analysis and provides solution recommendations to pre-defined business problems arising from KPI monitoring. Automatic root cause analysis and solution recommendation provides better support to business users than traditional KPI monitoring systems.

Figure 1:
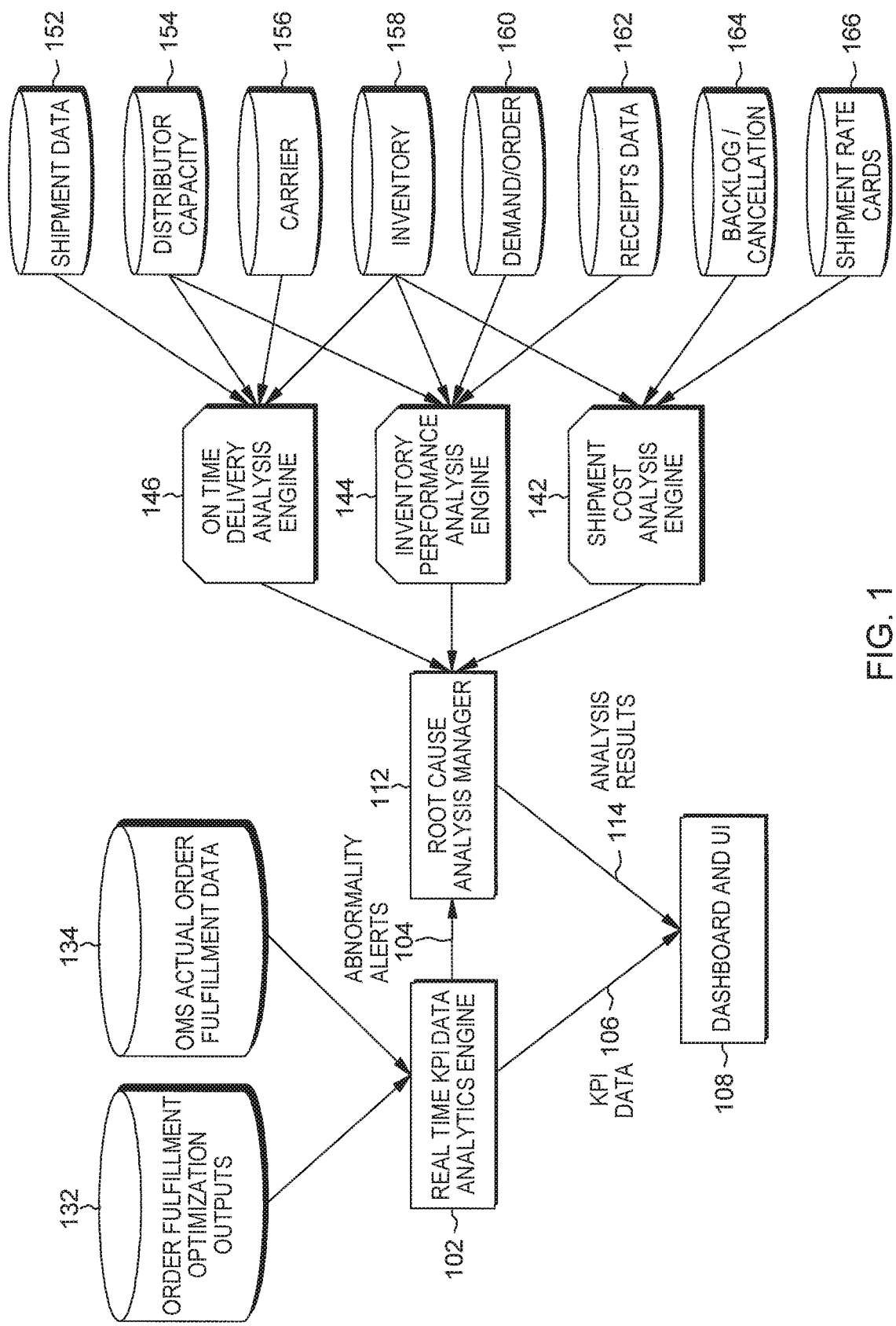
FIG. 1 shows a computing system and networked architecture that includes a real time KPI monitoring module and a root cause analysis manager module in one embodiment.

As shown in FIG. 1, the system 100 is a computing system and networked architecture that includes two integrated modules: 1) the real time KPI monitoring module 102 which runs methods for continuously monitoring business KPIs and create abnormality alerts 104; and 2) a root cause analysis manager module 112 which runs various analytics engines designed specifically for different business problems. These modules 102, 112 may be embodied in server devices, e.g., back-end network servers associated with an enterprise. Module 102 receives KPI data in real-time or near real-time, process the data, and provide processed data for display/update at a user interface (UI) providing a BI "dashboard" 108. The dashboard 108 receives real time KPI data 106 from KPI analysis engine 102 and periodically refreshes its data display. The dashboard further enables business users to customize and filter data for display using techniques known in the art.

As described in exemplary embodiments herein, the dashboard 108 is configured to receive root cause analysis results 114 from the root cause analysis manager 112 and create reports for users to visualize the root cause analysis results, in real-time, and enable a user to act on the results of the root cause analysis. Thus, for example, if a KPI via the BI dashboard indicates that an order has been delayed, the root cause analysis conducted may reveal the reason for the delay at a particular order fulfillment node (e.g., inventory issues, a shipping issue, backlog/worker fulfillment issue, etc.) and suggest or recommend any corrective action that may be taken to alleviate the reason for delay. At the very least it flags the issue to allow the business users to be aware of it and take action. For example, it may determine an order was delayed due to heavy load/backlog on the node—i.e., a build-up of online orders assigned to the node for fulfillment for which it just does not have the capacity to process due to limited workers. If it further determines that there are other nodes nearby that are less backlogged and could fill the sort of orders it has been receiving, it may suggest to adjust the fulfillment engine settings to send less orders to that node, or to re-assign the backlog of the node to other nearby nodes—listing out these reasons for the suggested actions.

In particular, the KPI monitoring module 102 receives data from real time data streams (e.g., optimization outputs) from order fulfillment optimization engine 132 and actual order fulfillment data from an Order Management System 134.

From the received real time data streams from order fulfillment optimization engine and order management system, the KPI monitoring system 102 calculates and updates real time KPI data 106 including, but not limited to such KPI data as: on-time delivery rate, average shipment zones, average order split rate, etc. The KPI monitoring system provides such updated/real time KPI data 106 to the Dashboard and UI 108 from which users may view and make decisions. Thus, as an example, a store that has depleted its inventory may cause orders to be cut-off or increased rate of back-orders which is a user may perceive as a problem. The user, accessing the dashboard, e.g., via a weblink, may have to drill down to obtain the relevant data and perform further processing in order to find out the cause of the actual performance issue (e.g., a store closing or depleted inventory). That is, for the case of store closing, the additional information may reveal the store was cut-off from e-commerce order fulfillment or that it was heavily over capacity, and so could not take further orders. For the case of depleted inventory, it may reveal that the inventory expected to be at that node to fulfill certain orders was already depleted. Further information obtained when drilling down into the problem via the UI, such as the time the inventory sold out at the store node, the replenishment schedule, and the walk-in sales velocity, may reveal that to the high sales velocity at the store, the replenishment needs to be triggered much earlier (by a higher inventory level)—leading to the suggestion to increase the replenishment threshold.

In one embodiment, the KPI monitoring system 102 includes a KPI data analytics engine that runs methods to thus determine abnormal occurrences or disturbances in the order fulfillment performance indicators, and trigger abnormality alerts when a KPI performance indicator: does not reach or achieve an acceptable predetermined limit or threshold value, or alternatively, exceeds an unacceptable predetermined limit or threshold value for that performance indicator. For example, from the historical fulfillment results, it might be determined that a rate of around 0.04% order cancellations (when an order or some part of it is cancelled to the customer—informing the customer they cannot receive the item they ordered) is the current normal operating procedure, so an automatic threshold based on, for example, being two standard deviations beyond the mean rate, or set by the business user, may be used to flag an anomalous cancel rate. If suddenly the rate of cancellation of orders passes this threshold—i.e., spikes to a much higher value, then the business users will be immediately notified of the problem and can take action remedy it.

As shown in FIG. 1, the abnormality alerts 104 are used to inform the business users and responsive alert signals trigger the root cause analysis module 112 to diagnose a specific business problem. The root cause analysis manager module 112 manages a collection of root cause analysis engines 142, 144, 146 which are designed for diagnosing specific business problem. For example, an analysis engines may include a Shipment Cost Analysis Engine 142, an Inventory performance analysis engine 144, and an On-time delivery analysis engine 146. Each of the analysis engines 142, 144, 146 makes use of the following data source types: Shipment data 152, Distributor capacity data 154, Carrier data 156, Inventory data 158, Demand/order data 160, Receipts data 162, Backlog/cancellation data 164, and Shipment rate cards data 166.

It is understood that there may be other types of root-cause analytic engines that can be operated in parallel besides those shown in FIG. 1 each designed for a specific business problem to give real time diagnosis and solution recommendations. The root cause analysis manager module 112 provides root cause analysis results 114 to the BI dashboard 108 where a user interface module is provided to present and visualize KPI performance data 106 and root cause analysis results 114.

Figure 2A:
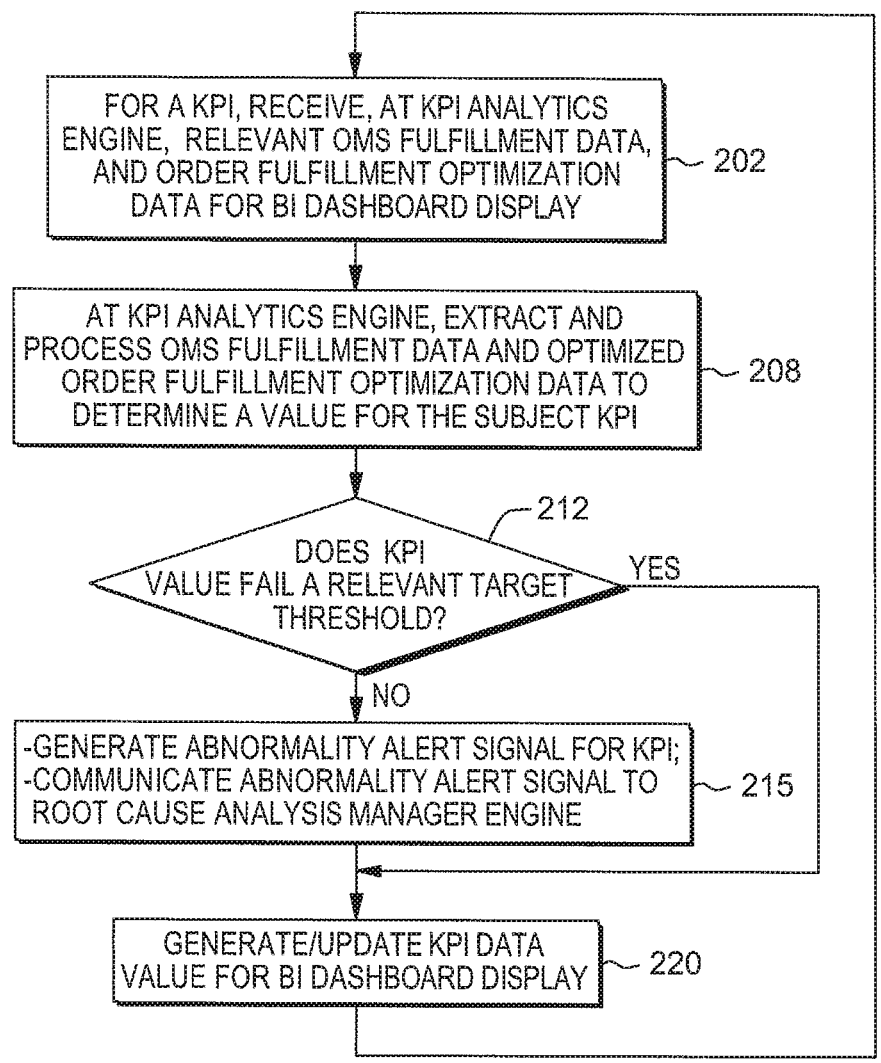
FIG. 2A shows a flow chart depicting the general processing at the KPI analytics engine of FIG. 1 in one embodiment.
Figure 9:
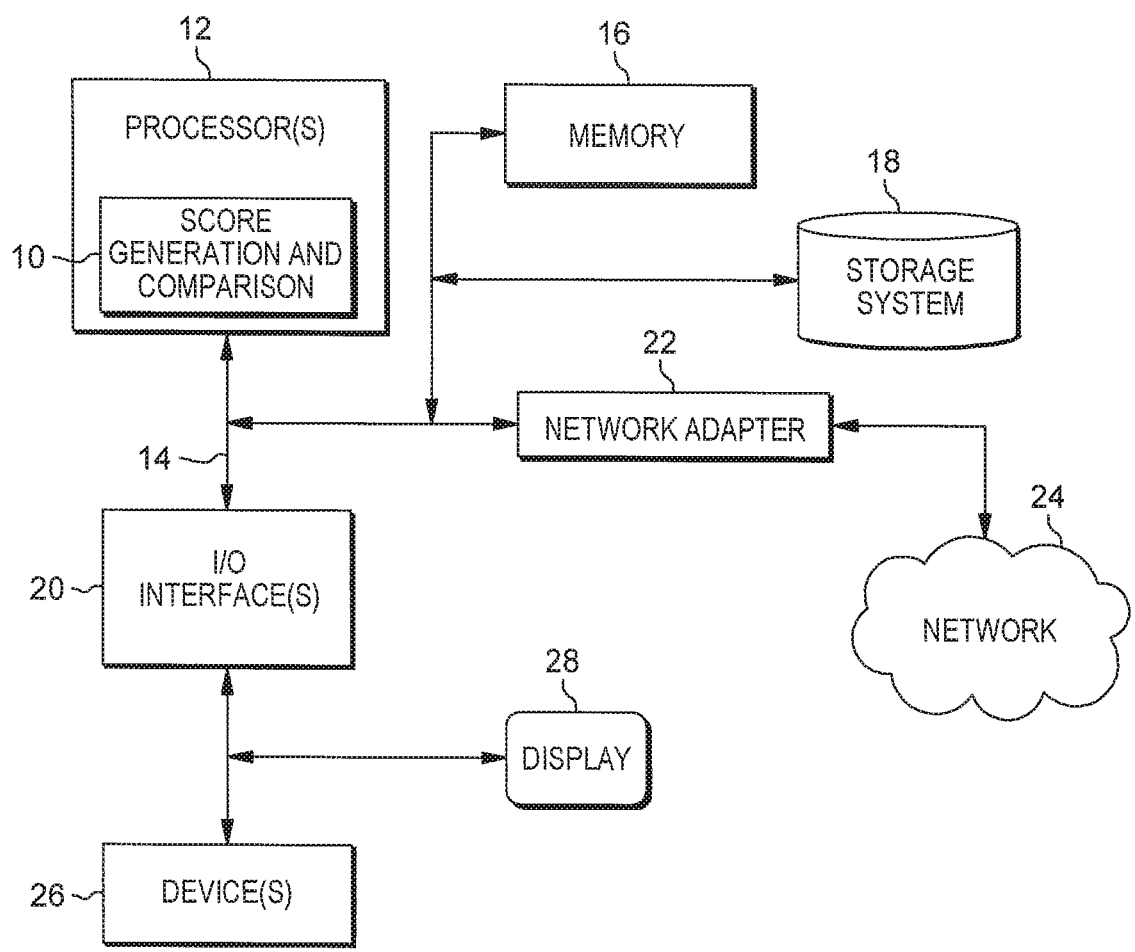
FIG. 9 depicts an exemplary hardware configuration for performing methods such as described in one embodiment.

Referring to FIG. 2A, there is shown a flow chart depicting a method 200 employed by the KPI analytics engine run on a computer system such as shown in FIG. 9. First step 202 depicts receiving at the KPI analytics engine 102, the relevant OMS fulfillment data from the OMS processing and receiving and extracting from the data streams the relevant order fulfillment optimization data for use in computing a specific KPI value. This data is typically processed and packaged for updating the BI dashboard display 108 of FIG. 1. Thus, at 208, as part of typical KPI analytics engine processing, the OMS fulfillment data and optimized order fulfillment optimization data is processed to determine a value for the subject KPI. Then at 212, the KPI analytics engine makes a further determination as to whether the computed KPI value is fails to meet or exceeds a relevant target KPI threshold(s). For example, from the historical fulfillment results, it might be determined that a rate of around 0.04% order cancellations (when an order or some part of it is cancelled to the customer—informing the customer they cannot receive the item they ordered) is the current normal operating procedure, so an automatic threshold based on, for example, being two standard deviations beyond the mean rate, or set by the business user, may be used to flag an anomalous cancel rate—that is used as the threshold value, for example, 0.1%. If suddenly the rate of cancellation of orders passes this threshold—i.e., suddenly becomes larger than 0.1%, then the business users will be immediately notified of the problem and can take action remedy it. As another example, number of upgrades from a node or group of nodes may be another KPI related to the shipping cost component. From historical trends it may be seen that for the particular node, an upgrade rate of 2% is normal, and 4% under heavy load times. A threshold during normal times of 3% may be set, if the percentage of upgrades of orders assigned to the node surpasses 3% in a given time period, performance failure will be flagged. If at 212, it is determined that the KPI value is within the relevant target threshold, then the process proceeds to 220 to generate and/or update the KPI data value at the BI dashboard display. The method then returns to step 202 to process the OMS and fulfillment data to obtain a further KPI data value.

Otherwise, at 212, FIG. 2A, if it is determined that the KPI value is not within the relevant target threshold, then the process proceeds to 215 to generate an abnormality alert signal for that failed KPI and communicate that abnormality alert signal to a root cause analysis manager engine for root cause analysis processing thereat. In addition to the calling the root cause analysis manager engine for processing thereat, the BI dashboard display may be updated with the failed KPI data value at 220. Ultimately, the KPI analysis engine processing returns to step 202 to repeat KPI performance monitoring.

Figure 2B:
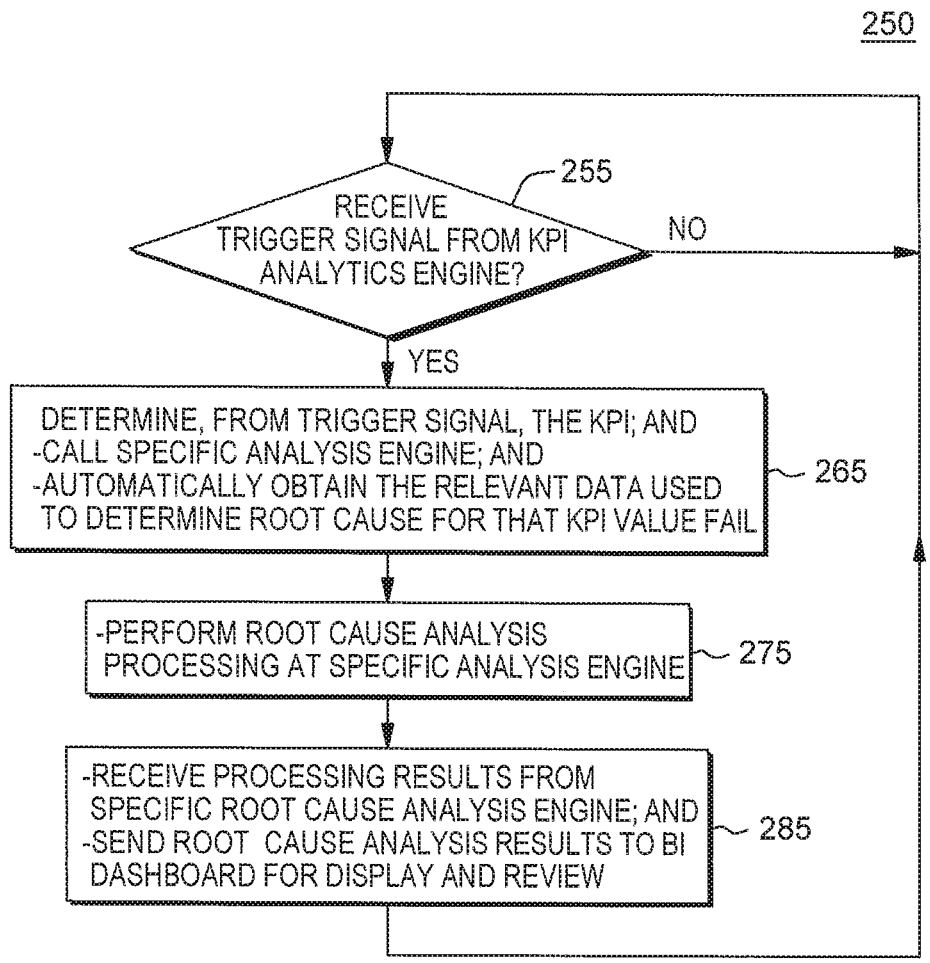
FIG. 2B, there is shown a flow chart depicting a method employed by the Root Cause analysis manager module of FIG. 1 in one embodiment.

Referring to FIG. 2B, there is shown a flow chart depicting a method 250 employed by the Root Cause analysis manager 112 run on the same or different computer system such as shown in FIG. 9. A first step 255 depicts monitoring receipt of signals such as from the KPU analytic engine 102 to detect a trigger signal for initiating a root cause analysis. The Root Cause analysis manager 112 is idle until such a signal is received at 255. Once a trigger signal is received, the Root Cause analysis manager 112 at 265 determines, from the alert trigger signal, the type of KPI; calls a specific root cause analysis engine; and automatically obtains the relevant data used to determine the root cause for that KPI value fail. The relevant data may be obtained from a single or multiple storage devices providing the data for which the KPI value is derived from. In one embodiment, the Root Cause analysis manager 112 may request a shipment cost analysis engine 142 to perform a root cause failure analysis such as shown and described with respect to FIG. 3; alternately, the Root Cause analysis manager 112 may request an inventory performance analysis engine 144 to perform a root cause failure analysis such as shown and described with respect to FIG. 4; and for example, the Root Cause analysis manager 112 may request an on-time delivery analysis engine 146 to perform a root cause failure analysis such as shown and described with respect to FIG. 5.

Returning to FIG. 2B, at 275, the specific Root Cause analysis manager 112 initiates the root cause analysis processing at the specific root cause analysis engine 142, 144, 146, and processes the data to determine root cause for that KPI value fail. In FIG. 2B, at 285, the analysis engine sends the root cause analysis results to the BI Dashboard for display and viewing thereat. This process subsequently returns to idle state at 255 to wait for a next trigger for a further root cause analysis. It is understood that while only three types of root cause analysis engines 142, 144, 146 are shown, it is understood that other types of root cause analyses may be conducted separately, or in addition, and the process may thus call other specific root cause failure analysis engines depending on the KPI failure type. Once presented with a root cause analysis information, a user viewing the BI dashboard may take an action, e.g., re-supply inventory for a product at a node. For example, if it is determined inventory was depleted, analysis may reveal that the inventory expected to be at that node to fulfill certain orders was already depleted. Further information obtained when analyzing the problem, such as the time the inventory sold out at the store node, the replenishment schedule, and the walk-in sales velocity, may reveal that to the high sales velocity at the store, the replenishment needs to be triggered much earlier (by a higher inventory level)—leading to the suggestion or action to increase the replenishment threshold. As another example, if high cancellation rate is discovered, root cause analysis may reveal the fulfillment engine is rejecting orders, even though inventory is available to fulfill those orders. In this case further investigation of the rejection may reveal a missing data issue, and the business user can take action to update the data for the fulfillment engine.

Figure 3:
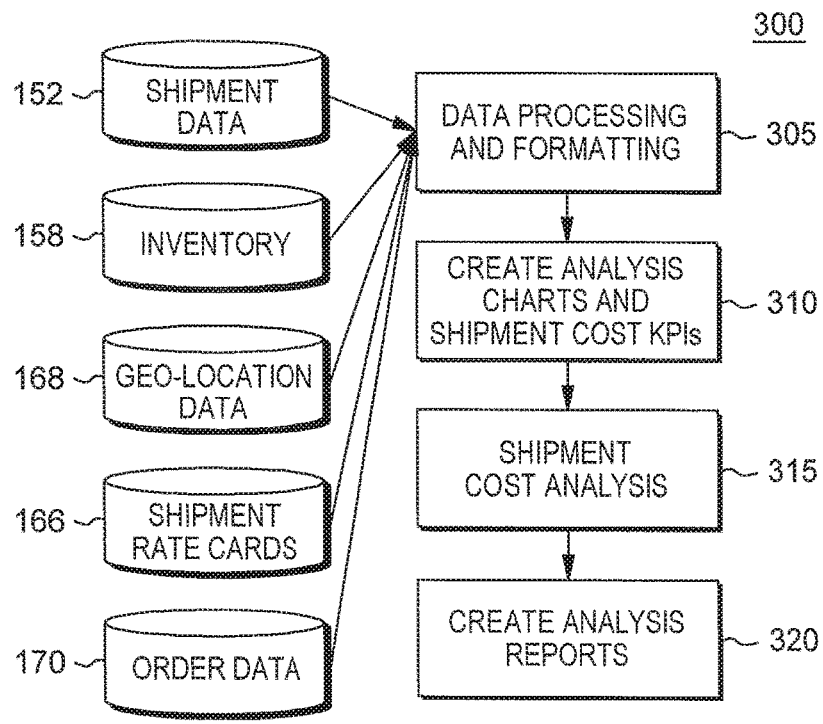
FIG. 3 depicts real-time operating methods run at a Shipment Cost Analysis Engine for determining a root cause failure analysis relating to a particular product shipping delay issue according to one embodiment.

Referring now to FIG. 3, there are provided operating methods 300 run at the Shipment Cost Analysis Engine 142 for determining a root cause failure analysis of a particular shipment delay KPI failure, for example, if shipping cost per order for a node or group of nodes passes a threshold, or if packages per order passes a threshold, or if number of upgrades passes a threshold, etc. As shown in FIG. 3, this analysis engine is caused to receive the following data from the OMS and other systems including, but not limited to: Shipment data 152—which data captures how orders were finally shipped to the customer—i.e., what were the package assignments and final carrier costs and which carrier was used and time of actual shipment, Inventory data 158—which captures the inventory levels for different items at different nodes at different points in time, Geo-location data 168—which captures such information as the location of the nodes in the networks and shipping zones between different locations; Shipment rate cards data 166—which captures the carrier rates—the cost of shipping packages of different weights across different pairs of origins and destinations for different carriers, and Order Management System (OMS) Order data 170—which data captures the information around the orders and their sourcing including what items were part of each order and which nodes they were assigned to for sourcing and when. The first step 305 of the Shipment Cost Analysis method 300 includes the processing and formatting of the data from multiple sources such as OMS, IMS, and TMS systems, etc. Further at 305 of the Shipment Cost Analysis method 300, the analysis engine 142 performs a data integrity check and verifies location, time zone, etc. This is necessary to be sure there is no issue with the data for which various decisions and analysis results are based on. For example, it might be discovered from the check that there are nodes in the network belonging to certain zip codes, but no rate information for those zip codes—i.e., missing rate card data—in which case rates could not be determined for those nodes.

Continuing at 310 of the Shipment Cost Analysis method 300, the analysis engine 142 creates analysis charts and shipment cost KPIs. At step 310, the shipment cost analysis engine may create KPIs such as, but not limited to: average zone, average order split, etc. Further generated may include a shipment lane volume chart, e.g., by origin and destination, and a demand destination average zone map. This is done by using such techniques as aggregation, joining, and summarization methods built into most modern database systems, or map-reduce style operations in big data systems. That is, it involves grouping data by certain attributes and computing statistics for values in the group. For example, to get average zones traveled for orders at a node, the system would group by, or filter, the set of orders shipped or sourced (sourcing details) to get just the sourcing results for orders fulfilled from the node in some past time period. Then this set would be joined with a zipcode pair to zones map (holding the number of zones for each origin-destination zipcode pair) on the origin and destination columns of the sourcing data to obtain the zones for each order. Finally summary statistics would be computed on the zones, to get such statistics as the average, standard deviation, etc. Additionally, other types of statistical, trend, and machine learning analysis could be used, such as moving averages, or clustering.

Step 315 performs a shipment cost analysis may include obtaining data configured to perform further types of shipment cost analyses such as: a demand and fulfillment node selection analysis, a shipment and shipping method selection analysis, and/or a shipment and carrier selection analysis. Then, at 320, one or more reports may be generated based on such shipment cost analyses performed which reports are communicated back to the BI dashboard for presentation and/or review.

Figure 4:
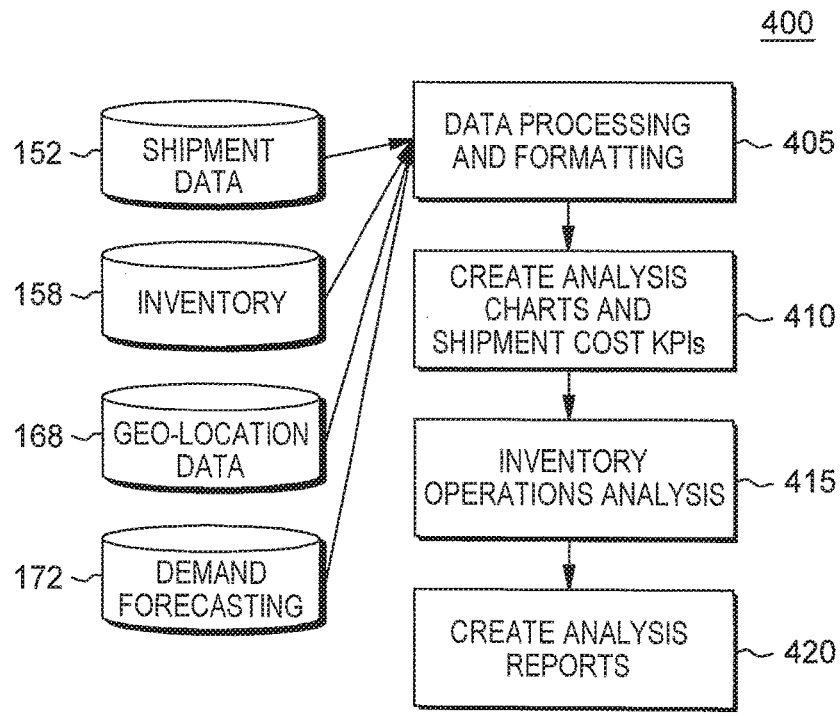
FIG. 4 depicts real-time operating methods run at an Inventory Performance Analysis Engine for determining a root cause failure analysis of a product inventory issue or failure according to one embodiment.

Referring now to FIG. 4, there are provided operating methods 400 run at the Inventory Performance Analysis Engine 144 for determining a root cause failure analysis of an inventory KPI issue or failure. For example, number of item stock-outs before end of season or replenishment date at a node or group of nodes, excessively high inventory levels/failure for inventory to deplete as planned, number of cancellations at a node, etc. As shown in FIG. 4, this analysis engine is caused to receive data from the OMS and other systems to facilitate this root cause analysis including, but not limited to: Shipment data 152, Inventory data 158, Geo-location data 168 and demand forecasting data 172—which can represent both ecommerce (online) and walk-in store sales forecasts—that is data-driven predictions of how much demand will be seen for particular items at particular stores and online and across the network. The first step 405 of the Inventory Performance Analysis method 400 includes the processing and formatting of the data from multiple sources such as OMS, IMS, and TMS systems, and including performing a data integrity check to verify locations, time zones, etc. For example, checking that inventory values are available for all nodes in the network, and that they are in expected ranges—e.g., no inventory values in the millions and no extreme negative values, no missing values, etc. Checking that forecasts are reasonable—meaning they do not predict impossibly high levels of sales or returns, etc. Continuing at 410 of the Inventory Performance Analysis method 400, the analysis engine 144 creates analysis charts and inventory KPIs. At step 410, the inventory performance analysis engine may create inventory KPIs such as, but not limited to: GMROI (gross margin return on inventory investment), an inventory turns KPI at node level. At step 410, the inventory performance analysis engine may further create an inventory heat map, and an order cancellation rate KPI at node level.

Continuing at 415, the Inventory Performance Analysis Engine 144 operates to perform: 1) an Inventory allocation sanity check, i.e., for determining if inventory is allocated close to demand; and 2) an Inventory threshold sanity check by analyzing order cancellation rate. These can be done by any number of techniques, using the forecast and inventory data. For example, for (1) it may determine what percentage of inventory is allocated to be within two shipping zones of forecasted demand—via aggregation and summarization techniques. If this percentage is too low then immediately it is determined inventory allocation is far off and if data is accurate would lead to issues down the line like higher shipping costs. For inventory thresholds, it may do probabilistic modeling on historical data to determine the relationship between threshold level and cancellation rate (for example, using logistic regression models), and determine with the current thresholds the cancellation rate is likely to be too high. Then, at 420, one or more reports may be generated based on such inventory operations analyses performed which reports are communicated back to the BI dashboard 108 for presentation and/or review, and to enable a user to take immediate corrective actions.

Figure 5:
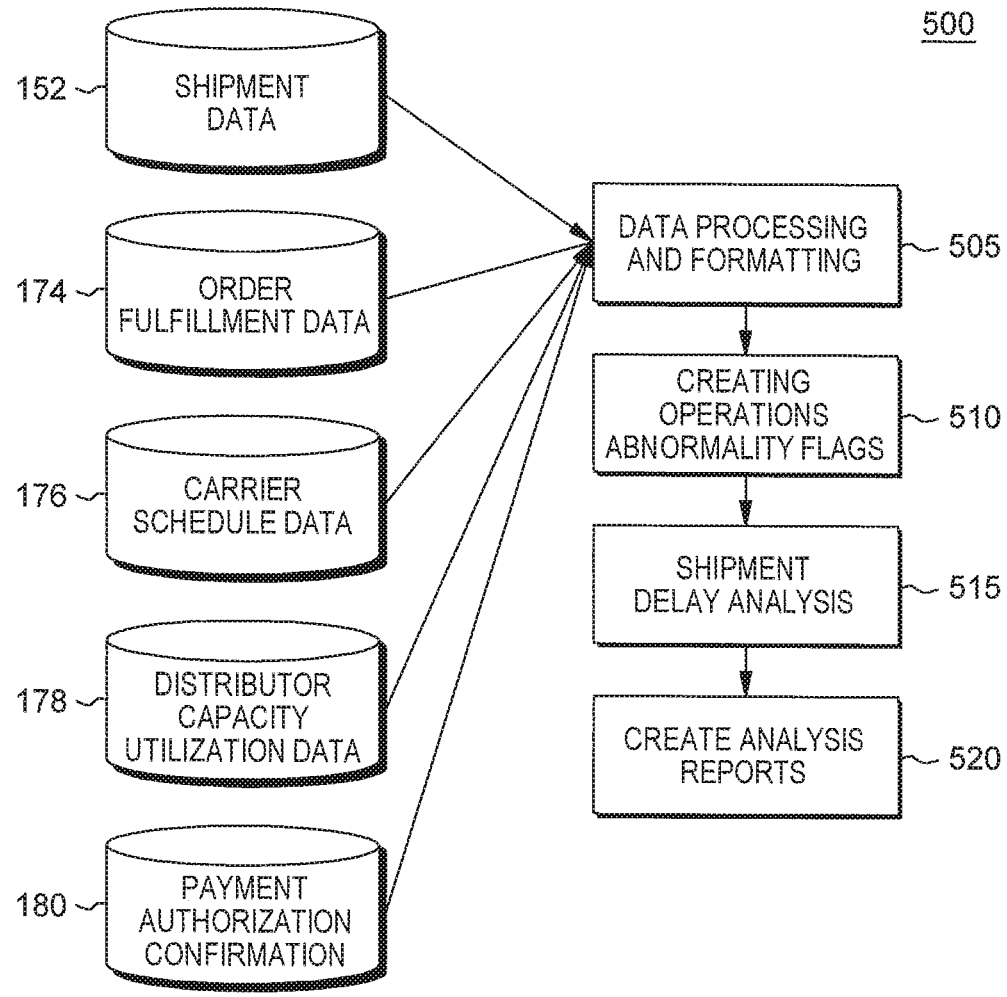
FIG. 5 depicts real-time operating methods run at an Ontime delivery analysis engine for determining a root cause failure analysis of why an order shipment has been delayed according to one embodiment.

Referring to FIG. 5, there are provided operating methods 500 run at the Ontime delivery analysis engine 146 for determining a root cause failure analysis of why an order shipment has been delayed, for example, a number of delayed orders at a node or group of nodes, average time to ship an order at a node or group of nodes, average number of days between carrier pick up and customer receipt, etc. As shown in FIG. 5, this analysis engine is caused to receive data from the OMS and other systems to facilitate this root cause analysis including, but not limited to: Shipment data 152, Order fulfillment data 174—which captures the information around the orders and their sourcing including what items were part of each order and which nodes they were assigned to for sourcing and when, Carrier schedule data 176—which captures when specific carriers make their pickups from a warehouse or store and arrive at different location, Distributor capacity utilization data 178—which captures the how many units or packages can be stored and processed, and payment authorization confirmation data 180—which captures when and how payments are finally authorized. The first step 505 of the Inventory Performance Analysis method 500 includes the processing and formatting of the data from multiple sources such as OMS, IMS, and TMS systems, and including performing a data integrity check to verify locations, time zones, etc. For example, checking that carrier information is complete for all node locations in the network (no missing data). Continuing at 510 of the On-time delivery analysis engine method 500, the analysis engine 146 creates abnormality flags. Thus, for example, at step 510, the on-time delivery analysis engine may create Operations abnormality flags by comparing an expected and actual timestamp data to flag operations abnormality such as order shipped late, order picked up by carriers late, order delivered by carrier late, etc. Thus, there may be obtained from the analysis key order checkpoint times, e.g., order scheduled time, order pick up time, order ship time, actual order pick-up time after shipment time. In one embodiment, then logic is implemented to identify from these key order checkpoint time information, a particular reason why a particular shipment may have been late or delayed.

Continuing at 515, the on-time delivery analysis engine 146 operates to perform: 1) a shipment delay analysis by implementing logic to identify the root cause of the shipment delay if multiple operations abnormality presents. Then, at 520, one or more reports may be generated based on such flagged operations abnormalities analyses performed which reports are communicated back to the BI dashboard 108 for presentation and/or review, and to enable a user to take immediate corrective action(s).

Figure 6:
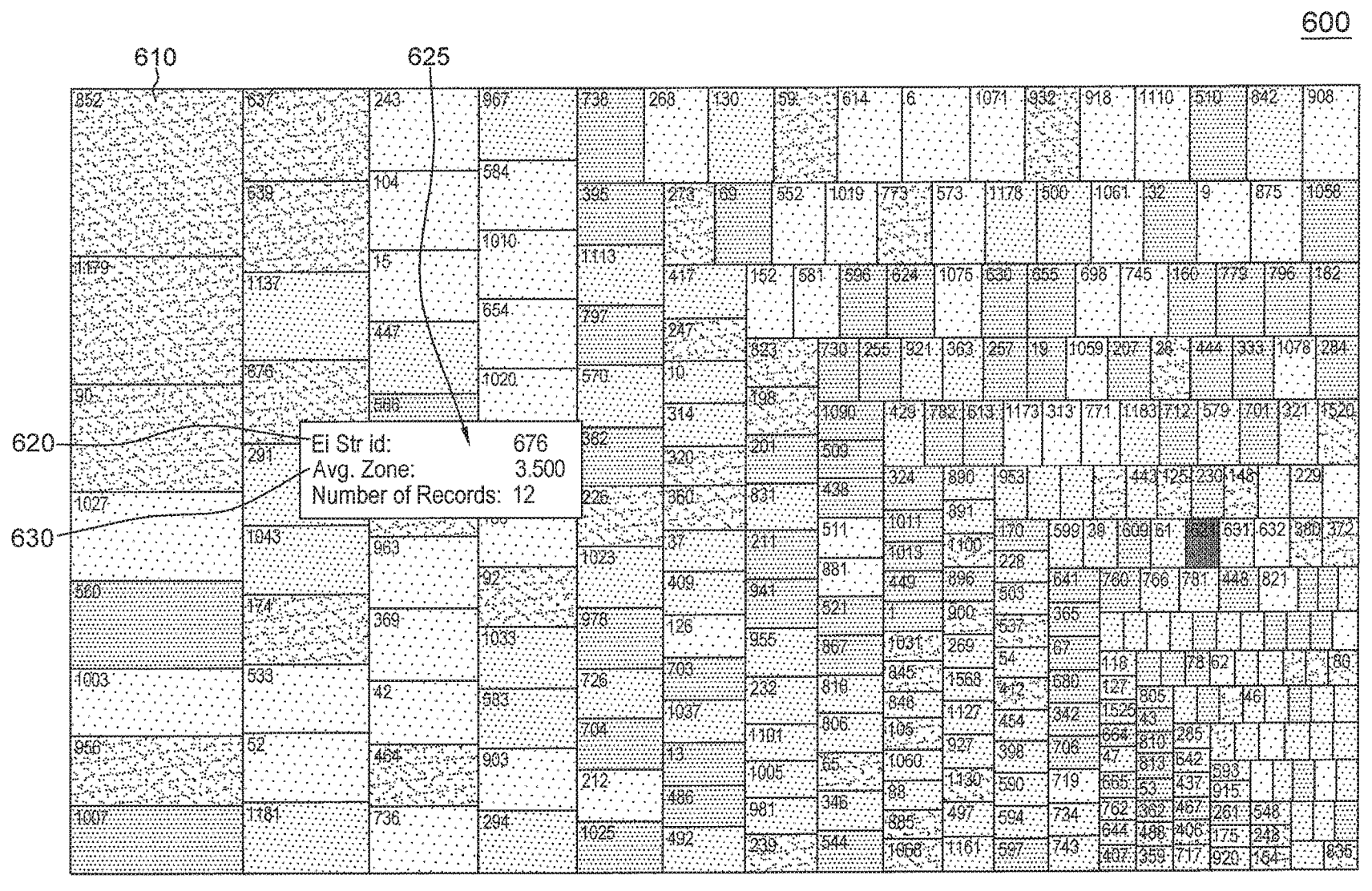

Referring back to Shipment coast analysis methods 300 of FIG. 3, the analysis engine 142 at step 310 automatically creates analysis charts such as a demand destination average zone map. FIG. 6 depicts such an example of a generated demand destination average zone map 600 (average zone at store level—i.e., the average number of shipment zones traveled for orders sourced or shipped from each particular node/store to reach their destinations—where shipment zones are standard measurements of distance used by retailers and carriers like FedEx and UPS). This map 600 is a "heat" map depicting average zones at a store level as may be visualized by the BI dashboard. This average zone at a store level heat map 600 may result from an analysis conducted to determine why an average zone is so high for some stores and not others. In view of FIG. 6, the "average zone" is one of the values in a tile 610—it is the average number of shipment zones orders from that node must travel to reach the order destination—so for example from historical data it may be seen for the last 10 k orders sourced to that node, 5 k had to travel 4 zones to reach the destination from that node, and 5 k had to travel 5 zones, the average zones would be 4.5 (the average number of shipment zones traveled by orders shipped from that node). For example, each of the tiles 610 represents a store and when selected by a user a label 625 is generated and displayed which indicates the particular store identifier (ID) 620 and an indication 630 of the average size of the volume of orders generated at that store. Additionally, the size of the tile 610 represents a number of orders or that store's volume of orders. A shade of the tile 610 also indicates the average zone, the darker the bigger. In one embodiment, an average zone value may range anywhere from between values of 2-6.5. This would mean on average orders sourced to/shipped from that node had to or would have to travel on average at least 2 shipment zones to reach their destination, or at most 6.5 shipment zones.

Figure 7:
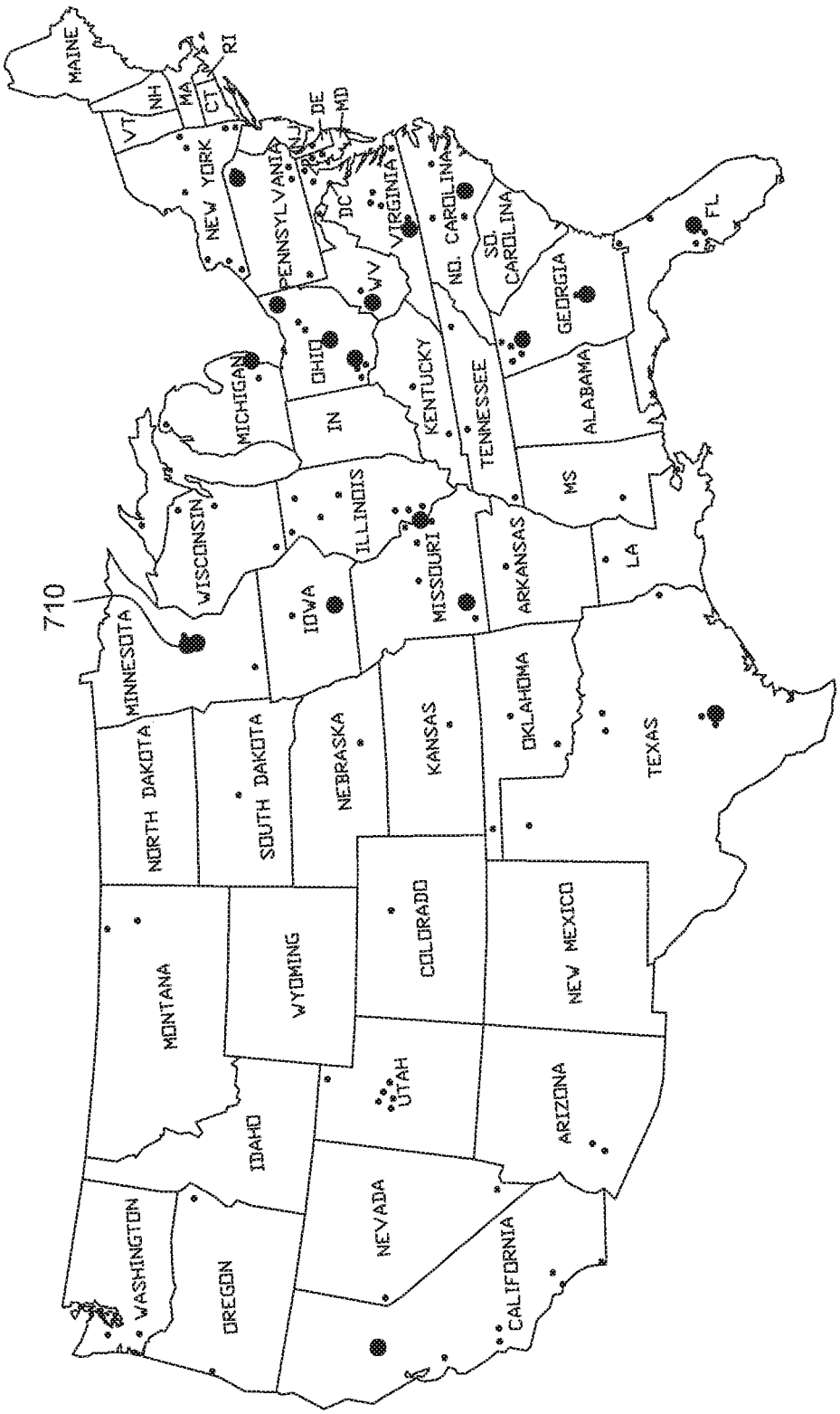
FIG. 7 depicts a plot of average shipment zone to demand points, where the location of spots are shown plotted against a map of an area according to one embodiment.

Thus, in one embodiment, business users can identify that among these stores, more than half have average zone >2, which indicates some location or sourcing logic issue. To further answer this question of why such issues, another dashboard view may be automatically generated from the root cause analysis engine 142 such as shown in FIG. 7 which depicts a plot 700 of average shipment zone to demand points, where the location of spots 710 are shown plotted against the map 725 of an area, e.g., a country such as the U.S. In FIG. 7, the size of the spots 710 is an indication of the volume of demand. The shade or color of the spots 710 may represent an average zone, e.g., the darker the shade the bigger the average zone.

Thus, from FIG. 7, there are shown many high demand locations (big spots 710) that have dark colors (high average zone), which indicates that there is no big fulfillment center nearby. Such root cause analysis results of FIGS. 6 and 7 may be presented via the BI dashboard 108 and may result in a user prompting the enterprise to provide an order fulfillment center nearer these high demand spots, or at least increase stock of particular products at nearby stores in these zones. That is, the root cause analysis reveals lack of alignment between demand and inventory, and can suggest several possible actions to remedy this—it thus provides a list of possible actions with the reasons why those actions would be suitable/address the issue.

The BI system and methods of FIG. 2 when used in conjunction with InBalance Order Fulfillment and Sourcing Engine processing provides a significant value to business users by monitoring operations disruptions and accelerating problem diagnosis speed resulting in potentially great savings for the customer.

Figure 8:
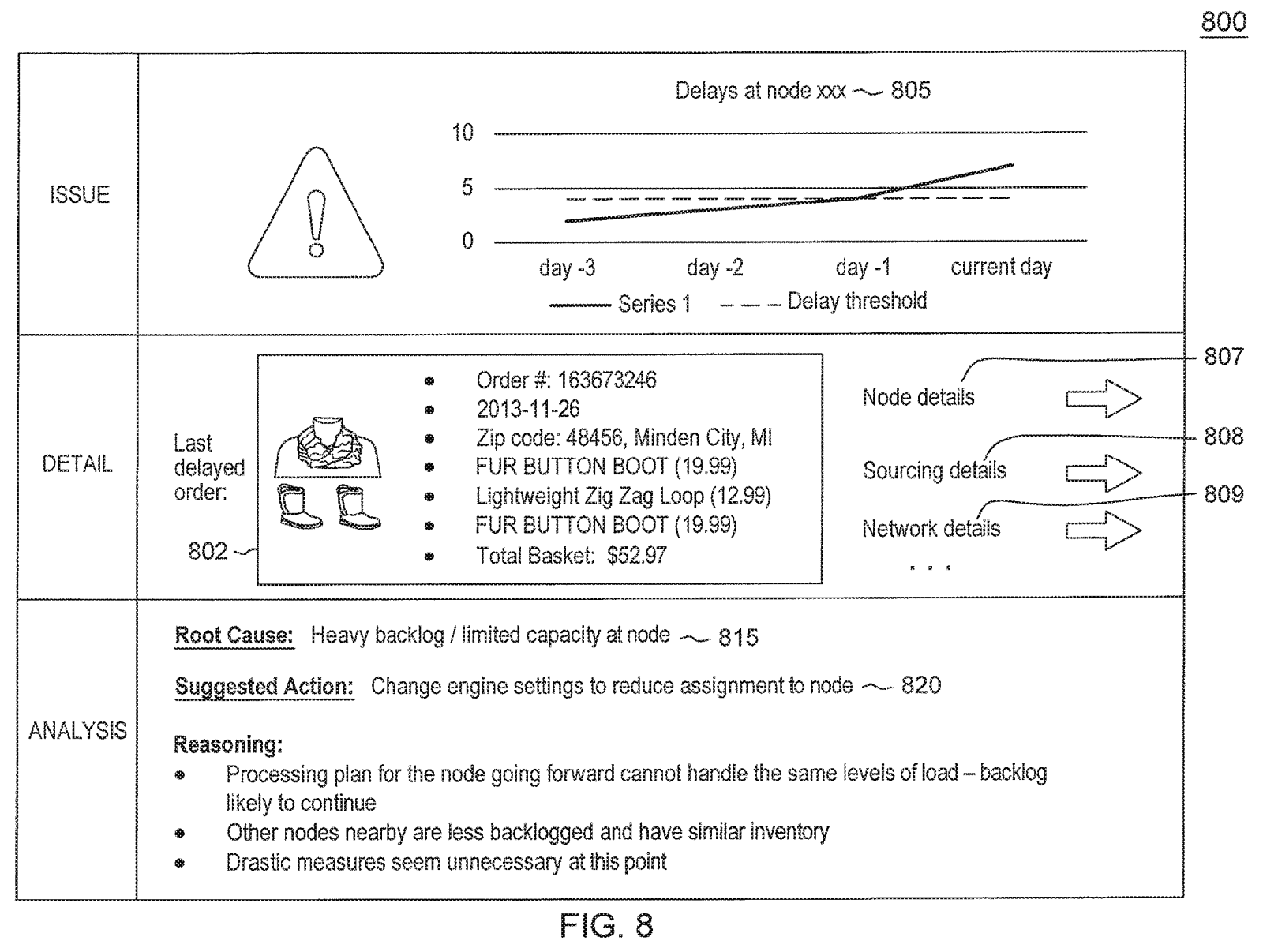

FIG. 8 depicts an example BI dashboard display interface 800 generated for a user to indicate a result of implementing the analytics methods of the present disclosure. Via the example BI display interface 800 shown in FIG. 8, there is presented an example alert for a particular customer order 805 generated by the KPI analytics engine 102. In the example, the alert 802 generated indicates a delay in fulfillment of an example customer order 805 at a specific order fulfillment node. In the example interface, the system generates a result of the KPI analytics which shows a delay in fulfillment orders that that node. The generated interface 800 provides links for a user to select in order to drill down and obtain further information regarding the operational details 807 at the particular node, specifics as to the product source/inventory details 808, and further details regarding the networking 809. These data and information 807-809 are used by the Root cause analysis manager in order to determine a root cause 815 for the detected performance issue, i.e., heavy backlog delays. In the example depicted, the root cause analysis manager further generates a suggested action 820 for ameliorating and/or eliminating the delays at that particular fulfillment node. Based on the root cause analysis conducted for the example order fulfillment delay as determined by the methods run herein, the BI dashboard display interface 800 may indicate suggested actions to eliminate the issue 805. For example, there may be determined particular suggested actions 820 to reduce order fulfillment assignments at that node. The reasoning behind this suggested action 820 may be a determination that the node going forward cannot handle the same levels of load and that the order fulfillment backlog is likely to continue. In addition, or alternatively, the analytics engine may determine that other order fulfillment nodes nearby are less backlogged and have similar inventory and that other drastic measures to reduce the backlog may be determined as unnecessary at this point in time.

FIG. 9 illustrates a schematic of an example computer or processing system that may implement continuously tracking business performance impact of optimized sourcing algorithms in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs an analytics engine's methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of optimizing order-fulfillment performance in an order fulfillment system comprising:
   continuously monitoring, at a processor device, data from one or more real-time data streams,
   computing at the processor device, based on said data from said one or more real-time data streams, a performance indicator value associated with fulfilling an order for a product in the order fulfillment system;
   evaluating, at the processor device said computed performance indicator value against a predetermined value associated with that performance indicator;
   automatically generating, by said processor device, an alert signal responsive to a computed performance indicator evaluated as one of: not achieving said predetermined value or exceeding said predetermined value for that performance indicator, said alert signal indicating a specific issue type associated with one or more operations performed to fulfill the product order;
   selecting a root cause analyzer device from among a plurality of root cause analyzer devices, said selected root cause analyzer device associated for real-time diagnosing the specific issue type;

communicating said alert signal to the selected root cause analyzer device to analyze a cause for said performance indicator one of: not achieving said predetermined value or exceeding said predetermined value for that performance indicator;

triggering, in response to receiving the alert signal, a root cause analysis processing at said selected root cause analyzer device to conduct real-time root cause analysis processing thereat;

obtaining relevant data from one or more storage devices storing data used for said root cause analysis performed at the selected root cause analyzer device;

determining, at the selected root cause analyzer device, a root cause analysis result for the performance indicator, said root cause analysis result indicating a deficiency or failure of an operation associated with fulfilling the order in a geographic region; and providing in real time, via a user interface device, a visualization of said root cause analysis results from the selected root cause analysis device, said visualization indicating a recommendation based on said deficiency or failure to improve an order fulfillment operation in the geographic region, wherein a selected root cause analyzer device from among a plurality of root cause analyzer devices comprises a processor device configured to perform a shipment cost analysis on historical data of shipped orders to a store; and based on said shipment cost analysis on historical data, providing via said user interface device a real-time heat map visualization depicting average zones at a store level representing an average number of shipment zones orders from a store must travel to reach an order destination; and using said heat map visualization to determine a store location associated within a particular zone indicated in said heat map to be stocked with additional product inventory for optimizing order fulfillment within the geographic region.

2. The method of claim 1, wherein prior to said computing:

extracting data relevant from said one or more real-time data streams relevant in computing said performance indicator value.

3. The method of claim 1, further comprising:

providing, via the user interface device, a visualization of said generated performance indicator.

4. The method of claim 1, wherein said performance indicator is associated with one or more business operations performed to fulfill a product order by an order fulfillment management system (OMS).

5. The method of claim 4, wherein said monitored data of said one or more real-time data streams includes order fulfillment data from said OMS, an order fulfillment optimization output data, or both said order fulfillment data from said OMS and an order fulfillment optimization output data.

6. The method of claim 1, wherein responsive to triggering a root cause analysis processing at said selected root cause analyzer device, verifying an integrity of said relevant data used to perform root cause analysis.

7. The method of claim 1, wherein said selected root cause analyzer device of said plurality of root cause analyzer devices comprises one of:

a first analysis processing module for real-time diagnosing a specific issue type relating to shipping of a product in fulfilling customer orders for said product;

a second analysis processing module for real-time diagnosing a specific issue type relating to timely delivery of a product to a customer in fulfilling customer orders for said product; or a third analysis processing module for real-time diagnosing a specific issue type relating to inventory levels of said product as maintained by an entity resulting from fulfilling customer orders for said product.

* * * * *